US007302321B2

(12) United States Patent
Suzuki et al.

(10) Patent No.: US 7,302,321 B2
(45) Date of Patent: Nov. 27, 2007

(54) INFORMATION PROVIDING DEVICE, INFORMATION PROVIDING SYSTEM, AND INFORMATION PROVIDING PROGRAM PRODUCT

(75) Inventors: Masayasu Suzuki, Yokosuka (JP); Toru Takagi, Yokohama (JP); Toshiro Muramatsu, Zushi (JP); Susumu Fujita, Yokohama (JP); Satoshi Chinomi, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 156 days.

(21) Appl. No.: 10/808,478

(22) Filed: Mar. 25, 2004

(65) Prior Publication Data

US 2004/0210358 A1 Oct. 21, 2004

(30) Foreign Application Priority Data

Apr. 4, 2003 (JP) ........................ P 2003-101099

(51) Int. Cl.
*B62D 13/00* (2006.01)

(52) U.S. Cl. ........................................ 701/23; 340/932

(58) Field of Classification Search .................. 701/23, 701/24, 96, 200, 301; 340/932, 902, 903, 340/904, 436, 479; 180/167, 169
See application file for complete search history.

(56) References Cited

U.S. PATENT DOCUMENTS

| | | | | | |
|---|---|---|---|---|---|
| 5,304,980 | A | * | 4/1994 | Maekawa | 340/435 |
| 5,331,561 | A | * | 7/1994 | Barrett et al. | 701/205 |
| 5,835,880 | A | * | 11/1998 | Gan et al. | 701/205 |
| 5,934,399 | A | * | 8/1999 | Iiboshi et al. | 180/169 |
| 6,128,559 | A | * | 10/2000 | Saitou et al. | 701/23 |
| 6,169,940 | B1 | * | 1/2001 | Jitsukata et al. | 701/23 |
| 6,313,758 | B1 | * | 11/2001 | Kobayashi | 340/932 |
| 6,553,288 | B2 | * | 4/2003 | Taguchi et al. | 701/23 |
| 6,640,164 | B1 | * | 10/2003 | Farwell et al. | 701/2 |
| 6,732,024 | B2 | * | 5/2004 | Wilhelm Rekow et al. | 701/26 |
| 2002/0188388 | A1 | | 12/2002 | Taguchi et al. | |

FOREIGN PATENT DOCUMENTS

| | | | |
|---|---|---|---|
| DE | 199 14 906 | A1 | 10/2000 |
| FR | 2 827 823 | A1 | 1/2003 |
| JP | 10-214397 | A | 8/1998 |
| JP | 2000-20884 | | 1/2000 |
| JP | 2000-339600 | A | 12/2000 |
| JP | 2001-71841 | A | 3/2001 |
| JP | 2001-91619 | A | 4/2001 |
| JP | 2002-117494 | A | 4/2002 |
| JP | 2002-170200 | A | 6/2002 |

OTHER PUBLICATIONS

Harker B. J., "Promote-Chauffeur II & 5.8 GHz Vehicle To Vehicle Communications System", International Conference on Advanced Driver Assistance System, Sep. 17-18, 2001, Conference Publication No. 483, pp. 81-85.

* cited by examiner

*Primary Examiner*—Dalena Tran
(74) *Attorney, Agent, or Firm*—McDermott Will & Emery

(57) ABSTRACT

An information providing device installed in a leader vehicle that leads a follower vehicle, for providing the follower vehicle with guidance prepared by the leader vehicle, the information providing device that includes a state detector configured to detect a state change in the leader vehicle to output a detecting signal and a guidance generator configured to receive the detecting signal from the state detector, the guidance generator configured to prepare, in response to the detecting signal, guidance to guide the follower vehicle, the guidance including a photographed image of a view ahead of the leader vehicle.

20 Claims, 6 Drawing Sheets

INFORMATION PROVIDING DEVICE, INFORMATION PROVIDING SYSTEM, AND INFORMATION PROVIDING PROGRAM PRODUCT

BACKGROUND OF THE INVENTION

The present invention relates to an information providing device to provide a follower vehicle with guidance for guiding the follower vehicle, a program for controlling the provision of information, and an information providing system.

Japanese Laid-Open Patent Publication No. 2000-20884 discloses a technique of allowing a leader vehicle and a follower vehicle to transmit and receive still or motion images taken at a desired position. According to this technique, the follower vehicle can obtain an image taken at a position optionally selected by the leader vehicle or an image taken at a position (to be passed by the follower vehicle) optionally selected by the follower vehicle. The obtained image can be used as route guidance or congestion avoidance information.

SUMMARY OF THE INVENTION

The related art mentioned above gives no consideration for the timing of the leader vehicle to take a photograph that guides the follower vehicle, and therefore, is unable to provide images appropriate for route guidance. Images taken at standardized timing or at regular intervals do not always include information that correctly shows a route to follow. In addition, selecting information that may correctly show a route to follow from among moving images that have tactlessly been taken is laborious work for the follower vehicle. Another disadvantage of the related art is that transmitting and receiving a mixture of useless and useful images for route guidance cause a great loss in time, labor, and cost. An object of the present invention is to provide a technique that allows a leader vehicle to prepare guidance that correctly leads a follower vehicle.

An aspect of the present invention provides an information providing device installed in a leader vehicle that leads a follower vehicle, for providing the follower vehicle with guidance prepared by the leader vehicle, the information providing device includes that a state detector configured to detect a state change in the leader vehicle to output a detecting signal and a guidance generator configured to receive the detecting signal from the state detector, the guidance generator configured to prepare, in response to the detecting signal, guidance to guide the follower vehicle, the guidance including a photographed image of a view ahead of the leader vehicle.

Another aspect of the present invention provides an information providing device installed in a follower vehicle that follows a leader vehicle, the information providing device includes that a guidance obtainer configured to obtain guidance including a photographed image of a view ahead of the leader vehicle that leads the follower vehicle, a position and time indicating where and when the guidance was prepared; a history detector configured to detect running history of the follower vehicle; and an output unit configured to provide with the guidance obtained by the guidance obtainer, wherein the guidance obtainer includes, an eraser configured to compare the running history detected by the history detector with position where the guidance was prepared and erase the guidance if a result of the comparison shows that the follower vehicle has already passed the position; and a selector configured to select the oldest guidance from among guidance pieces not erased by the eraser and transfer the selected guidance to the output unit.

Furthermore, the another aspect of the present invention provides an n information providing device includes that a guidance obtainer configured to obtain guidance including a photographed image of a view ahead of a leader vehicle that leads a follower vehicle and a position where the guidance was prepared; a history detector configured to detect running history of the follower vehicle; and an output unit configured to provide with the guidance obtained by the guidance obtainer, wherein the guidance obtainer includes a selector configured to compare the running history with the position, the selector configured to select the guidance that was prepared at the closest position ahead of a present position of the follower vehicle, and the selector configured to transfer the selected guidance to the output unit.

Still furthermore, the another aspect of the present invention provides an information providing system includes that a sender used when a vehicle is a leader vehicle that leads a follower vehicle, the sender configured to send guidance for guiding the follower vehicle to the follower vehicle, the sender including; a state detector configured to detect a state change in the leader vehicle; and a guidance generator configured to prepare, in response to the state change detected by the state detector, the guidance including a photographed image of a view ahead of the leader vehicle; and a presenter installed in the follower vehicle, configured to receive the sent guidance and present guidance, the presenter including, a guidance obtainer configured to obtain guidance including a photographed image of a view ahead of the leader vehicle; and an output unit configured to provide the user with the guidance obtained by the guidance obtainer.

DETAILED DESCRIPTION OF EMBODIMENTS

Figure 1:
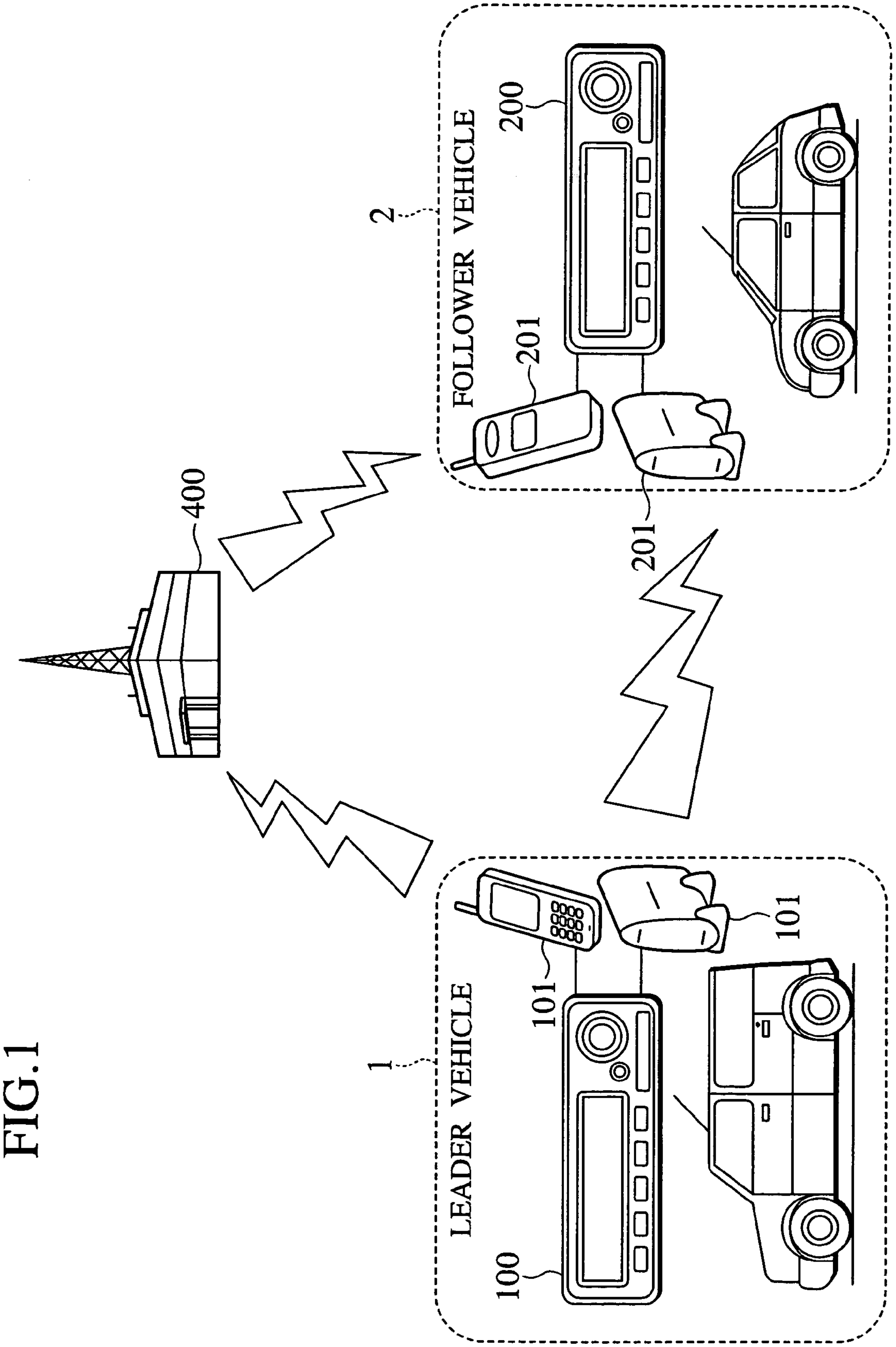
FIG. 1 is a schematic view showing an information providing system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. The drawings are merely representative examples and do not limit the invention.

First Embodiment

Information Providing System

FIG. 1 is a schematic view showing an information providing system according to a first embodiment of the present invention. In this system, a leader vehicle transmits guidance to guide a follower vehicle that follows the leader vehicle. The system is employed, for example, when a plurality of vehicles run toward the same destination. Particularly, the system can be used when a vehicle driven by a driver who is familiar with a route to a destination leads the other vehicles.

In FIG. 1, a leader vehicle 1 has a sender 100 to send guidance and a transmitter-receiver 101. The transmitter-receiver 101 may be incorporated in the sender 100. A follower vehicle 2 has a presenter 200 to receive the guidance and present it to a user in the follower vehicle 2 and a transmitter-receiver 201. The transmitter-receiver 201 may be incorporated in the presenter 200. Communication between the sender 100 and the presenter 200 may be conducted directly or via a server 400. The transmitter-receivers 101 and 201 may be public communication network devices such as mobile communication devices, cellular phones, and vehicle telephones, or vehicle-to-vehicle radio communication devices employing a narrow-band communication network such as a radio LAN.

Sender

Figure 2:
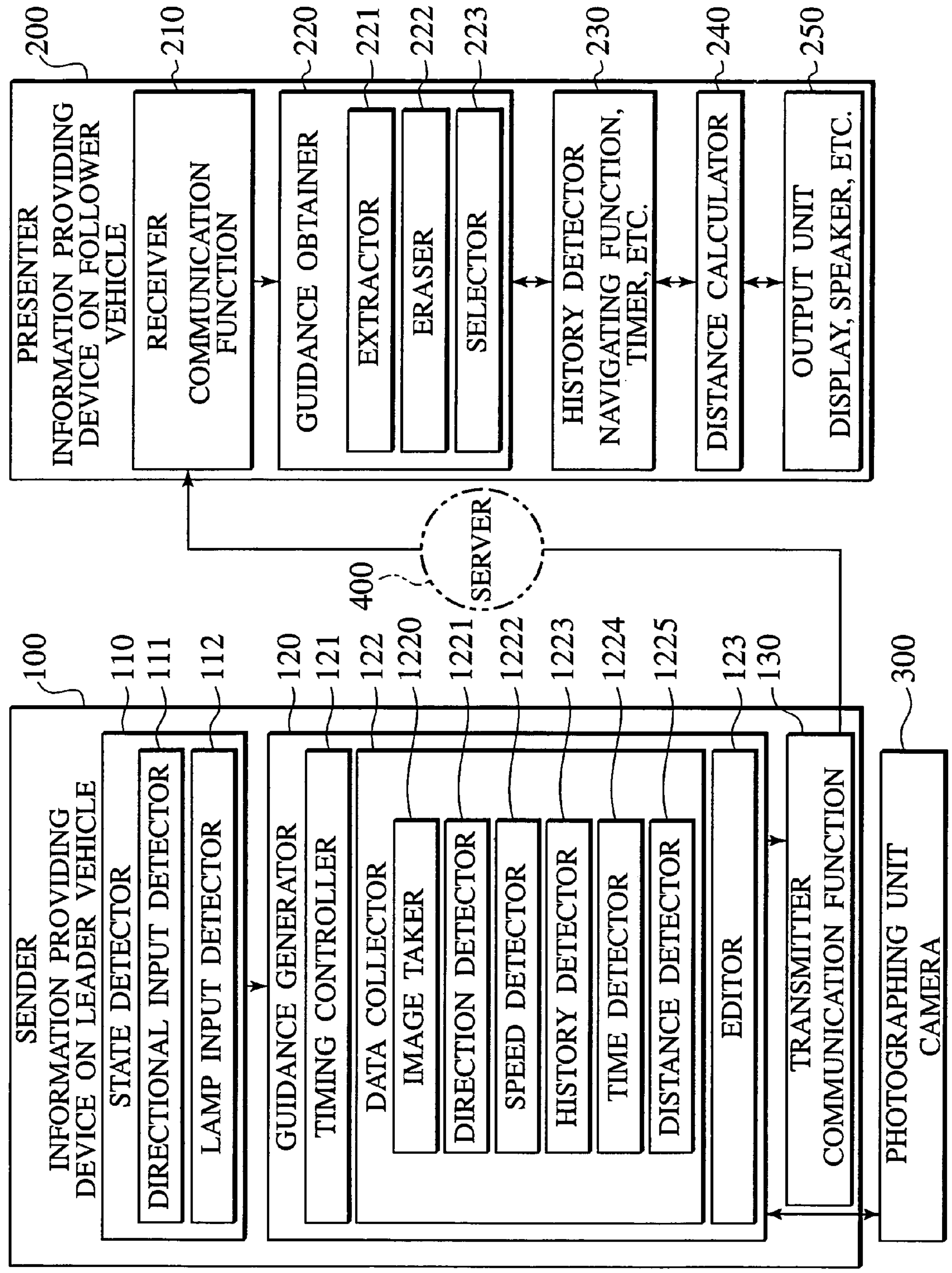
FIG. 2 is a block diagram showing the information providing system according to the embodiment.

FIG. 2 is a block diagram showing the sender 100 and presenter 200 of the information providing system. According to the embodiment, the sender 100 is installed in the leader vehicle 1 and the presenter 200 in the follower vehicle 2. This arrangement, however, does not limit the present invention. The presenter 200 may be installed in the leader vehicle and the sender 100 in the follower vehicle. A given vehicle may have both the sender and presenter, and when the vehicle serves as a leader vehicle, the sender is activated. When the vehicle serves as a follower vehicle, the presenter is activated. The sender 100 may be realized with a computer mounted on the leader vehicle and an information providing program executed by the computer.

The sender 100 has a state detector 110 to detect a state change in the leader vehicle, a guidance generator 120 to prepare guidance, and a transmitter 130 to transmit the guidance to the presenter 200 on the follower vehicle. The sender 100 may includes a ROM storing a guidance preparing program, a CPU functioning as the guidance generator 120 by executing the program stored in the ROM, and a RAM to store information.

The state detector 110 detects a state change in the leader vehicle. A state change occurs in the vehicle when the driver of the vehicle gives an input to the vehicle. The input is caused by a driver's manual operation like a steering operation, a turn signal operation, and a light switch operation, or by a driver's foot operation on an accelerator, a brake, or a clutch. A directional input detector 111 detects a change in the running direction of the vehicle. Namely, it detects an input to the turn signal of the vehicle as a state change. The state detector 110 is electrically connectable to the steering, the turn signal, or the light switch to detect the driver's manual operation like a steering operation, a turn signal operation, or a light switch operation. The state detector 110 is also electrically connectable to the accelerator, the brake, or the clutch to detect the driver's foot operation. The state detector 110 according to this embodiment outputs a detecting signal when the manual operation or the foot operation is detected.

The guidance generator 120 collects guidance data in response to a trigger which is a vehicle state change such as a change in the turn signal detected by the state detector 110. In this embodiment, the guidance generator 120 receives the detecting signal from the state detector 110. The guidance generator 120 includes a timing controller 121, a data collector 122, and an editor 123. The timing controller 121 receives a detected result from the state detector 110, and based on the received result, controls guidance preparation timing. This control is carried out to prepare guidance that can smoothly lead the follower vehicle. Namely, the timing controller 121 controls the timing so that the prepared guidance may allow the driver of the follower vehicle to grasp a positional relationship between the follower vehicle and the leader vehicle and correctly follow the leader vehicle.

According to this embodiment, guidance is prepared when the directional input detector 111 detects a directional input. The guidance generator 120 obtains an image at least ahead of the leader vehicle taken by a photographing unit 300. At the timing when the directional input detector 111 detects an input to the turn signal, an image taker 1220 issues an instruction to photograph a view ahead of the leader vehicle to the photographing unit 300 and obtains the photographed image from the photographing unit 300. According to this embodiment, the photographing unit 300 is a CCD camera. This, however, does not limit the present invention.

The timing when the turn signal of the leader vehicle receives a directional input is the timing when the leader vehicle is going to change its direction. An image ahead of the leader vehicle taken at the timing when the driver of the leader vehicle intends to turn to the left or right serves as useful guidance for the follower vehicle. When the driver of the leader vehicle inputs a directional instruction to turn, for example, to the right, an image ahead of the leader vehicle is taken and is sent as guidance to the follower vehicle. Upon receiving the guidance, the driver of the follower vehicle can find the timing when the driver of the leader vehicle changed the running direction. Then, the driver of the follower vehicle can prepare for changing the direction of the follower vehicle to the same direction with sufficient time and will never miss the timing of right or left turn even on a congested road. An image ahead of the leader vehicle taken after the completion of right or left turn is useless to tell the driver of the follower vehicle of a direction change of the leader vehicle.

The "guidance" according to this embodiment includes not only an image ahead of the leader vehicle but also an instructed direction, time, a position, a running speed, and a distance between the leader vehicle and the follower vehicle. Accordingly, the data collector 122 includes a direction detector 1221, a speed detector 1222, a history detector 1223, a time detector 1224, and a distance detector 1225. The direction detector 1221 detects a directional input (left turn or right turn) to the turn signal of the leader vehicle. The speed detector 1222 detects a running speed of the leader vehicle. The running speed may be a running speed at the time when guidance is sent, an average speed for a predetermined time period, or an average speed between the timing of guidance preparation and the next timing of guidance preparation. Including a running speed of the leader vehicle in the "guidance" allows the follower vehicle to run at a speed matching with the running speed of the leader vehicle. This enables the follower vehicle to keep a constant distance relative to the leader vehicle and correctly follow the leader vehicle.

The history detector 1223 detects running history of the leader vehicle. The history detector 1223 may be a navigator employing a gyroscope or a GPS (global positioning system) installed in the vehicle to detect the position of the vehicle. The running history includes the position, position related to time, past route, present route, and estimated future route of the leader vehicle. Including a position of the leader vehicle in the "guidance" allows the driver of the follower vehicle to confirm the position (running spot) where the image ahead of the leader vehicle was taken. Namely, the driver of the follower vehicle can conform the location of the presented image (of, for example, a crossing), to correctly follow the leader vehicle.

The time detector 1224 is a timer accessible by at least the speed detector 1222 and history detector 1223. Relating each element of guidance to time allows the driver of the follower vehicle to confirm when the image ahead of the leader vehicle was taken and correctly follow the leader vehicle.

The distance detector 1225 detects a relative distance between the leader vehicle and the follower vehicle according to a running speed of the leader vehicle, a position of the leader vehicle related to time, a running speed of the follower vehicle, and a position of the follower vehicle related to time. Including a vehicle-to-vehicle distance in the "guidance" allows the driver of the follower vehicle to confirm the distance between the leader vehicle and the follower vehicle and correctly follow the leader vehicle. The running speed of the leader vehicle is obtained from the speed detector 1222, and the position of the leader vehicle related to time is obtained from the history detector 1223 and time detector 1224. The running speed of the follower vehicle and the position of the follower vehicle related to time are obtained from a history detector 230 installed in the follower vehicle.

The editor 123 edits and combines or multiplexes the collected data into guidance to be sent to the follower vehicle. To reduce the quantity of data transmitted by radio, the image ahead of the leader vehicle, photographed time, directional information, and position (photographed spot) may be transmitted to the follower vehicle without editing them, and the follower vehicle may edit the received data and present guidance to the driver. The guidance from the editor 123 is sent to the presenter 200 of the follower vehicle through the transmitter 130.

Figure 3:
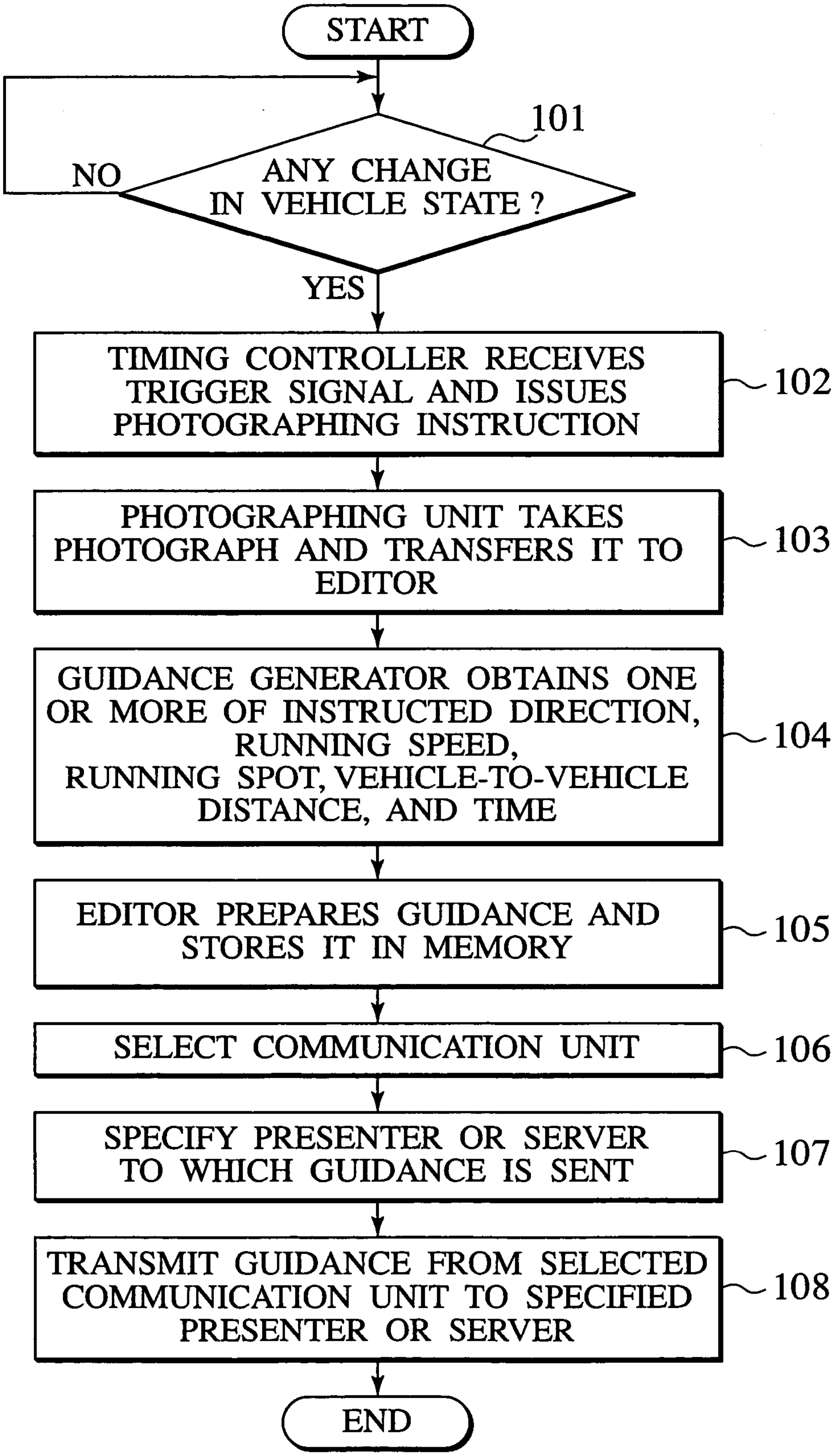
FIG. 3 is a flowchart showing a control procedure of a sender according to the embodiment.

FIG. 3 is a flowchart showing a typical operation of the sender 100 according to the embodiment. First, the state detector 110 detects a state change in the leader vehicle. More precisely, the directional input detector 111 detects an input to the turn signal of the leader vehicle (S101).

The timing controller 121 of the guidance generator 120 receives a trigger signal from the directional input detector 111. The timing controller 121 issues an instruction to the photographing unit 300 to photograph a view ahead of the leader vehicle (S102). The photographing unit 300 sends a photographed image to the editor 123 (S103).

At or around the timing to carry out steps S102 and S103, the data collector 122 collects one or more of the input direction (right or left), running speed, and position of the leader vehicle and a vehicle-to-vehicle distance (S104). The editor 123 edits and combines or multiplexes the data collected by the data collector 122 into guidance and stores the guidance (S105).

In step S106, the transmitter 130 is selected (S106). If there is only one transmitter 130 or if a communication method is predetermined, step S106 will be omitted. Thereafter, the presenter of the follower vehicle to which the guidance is going to be sent is specified (S107), and the guidance is sent to the specified presenter (S108). Steps S107 and S108 may be carried out by the transmitter 130. The sender 100 beforehand stores data such as a telephone number and an IP address to communicate with the presenter 200 of the follower vehicle.

The sender (the presenter of the leader vehicle) of this embodiment never asks the driver of the leader vehicle to carry out special operations to prepare and send guidance to correctly lead the follower vehicle. The embodiment automatically prepares and sends proper guidance at correct timing and never sends useless guidance. This reduces the processing load of the information providing system as a whole, communication cost, and labor to pick up useful information from a bulk of information pieces.

An input to the turn signal of the leader vehicle is detected as a trigger to prepare guidance, and the guidance is sent to the follower vehicle to inform the driver of the follower vehicle of steering timing. The guidance may contain the direction of the turn signal, to tell the driver of the follower vehicle a steering direction. As mentioned above, the guidance may include the running speed and position of the leader vehicle and a vehicle-to-vehicle distance, to correctly guide the follower vehicle.

Presenter

The presenter 200 is installed in the follower vehicle that follows the leader vehicle. The presenter 200 may be a computer mounted on the follower vehicle and an information providing program executed by the computer.

In FIG. 2, the presenter 200 includes a receiver 210 to communicate with the sender 100 of the leader vehicle, a guidance obtainer 220 to obtain guidance from the sender 100, a history detector 230 to detect running history of the follower vehicle, a distance calculator 240 to calculate a distance between the leader vehicle and the follower vehicle, and an output unit 250 to output guidance. Typically, the presenter 200 has a ROM storing a program to obtain guidance, a CPU to execute the program stored in the ROM to realize the guidance obtainer 220, and a RAM to store data.

The receiver 210 conducts communication with the transmitter 130 of the sender 100. The output unit 250 outputs image information, character information, and voice information. Typically, the output unit 250 employs a display to output image information and character information and a speaker to output voice information.

The guidance obtainer 220 obtains guidance sent from the sender 100. The guidance obtainer 220 includes an extractor 221, an eraser 222, and a selector 223. The extractor 221 extracts, from given guidance, various information pieces including the running speed, position, and time of the leader vehicle and the like. The eraser 222 erases unnecessary guidance. More precisely, the eraser 222 compares the position of the leader vehicle extracted by the extractor 221 with the running history of the follower vehicle detected by the history detector 230 and erases the guidance concerned if the comparison tells that the follower vehicle has already passed the position. Then, any guidance left in the guidance obtainer 220 must relate to a route to the leader vehicle which the follower vehicle must follow. Erasing guidance related to a position the follower vehicle already passed reduces the quantity of data to process. Relying on the erasing operation of the eraser 222, the selector 223 selects oldest guidance from among the remaining guidance pieces. This is a first aspect of the selector 223. This will be explained in more detail. Each guidance piece contains time at which the guidance was obtained, and the extractor 221 extracts the time. According to the extracted time, the selector 223 selects oldest guidance.

The eraser 222 erases any guidance related to a position the follower vehicle has already passed. Accordingly, the oldest guidance selected by the selector 223 relates to a nearest position ahead of the present position of the follower vehicle. Namely, the driver of the follower vehicle is always presented with guidance for a nearest position ahead of the present location of the follower vehicle. The guidance includes an image ahead of the leader vehicle. If the image was taken in response to an input to the turn signal of the leader vehicle, the image will teach the driver of the follower vehicle a steering direction at a coming right or left curve. In other words, the driver of the follower vehicle can drive straight up to the position shown in the image of the guidance. With this correct guidance, the follower vehicle can surely follow the leader vehicle.

A second aspect of the selector 223 will be explained. This aspect is independent of the eraser 222. The selector 223 compares the driving history of the follower vehicle detected by the history detector 230 with a position contained in each guidance piece and selects a guidance piece obtained at a nearest position ahead of the present position of the follower vehicle. This selection operation is conducted by considering the running direction of the follower vehicle and preferably selects guidance related to a nearest position on a route in the running direction of the follower vehicle. The second function of the selector 223 always provides the driver of the follower vehicle with guidance for a nearest position ahead of the present position of the follower vehicle, so that the follower vehicle can correctly follow the leader vehicle.

The distance calculator 240 calculates a relative distance between the leader vehicle and the follower vehicle according to a position the leader vehicle has already passed, time when the leader vehicle passed the position, a running speed of the leader vehicle, a position the follower vehicle passed, time when the follower vehicle passed the position, and a speed of the follower vehicle. The position the leader vehicle passed, the time when the leader vehicle passed the position, and the speed of the leader vehicle are included in the guidance. The extractor 221 extracts the position the follower vehicle passed, the time when the follower vehicle passed the position, and the speed of the follower vehicle with the use of the history detector 230 and a speed sensor provided for the follower vehicle. The speed of the leader vehicle and the speed of the follower vehicle may be those measured when the guidance was obtained, or average speeds between the timing when the guidance was obtained and the timing when the next guidance is obtained.

Figure 4:
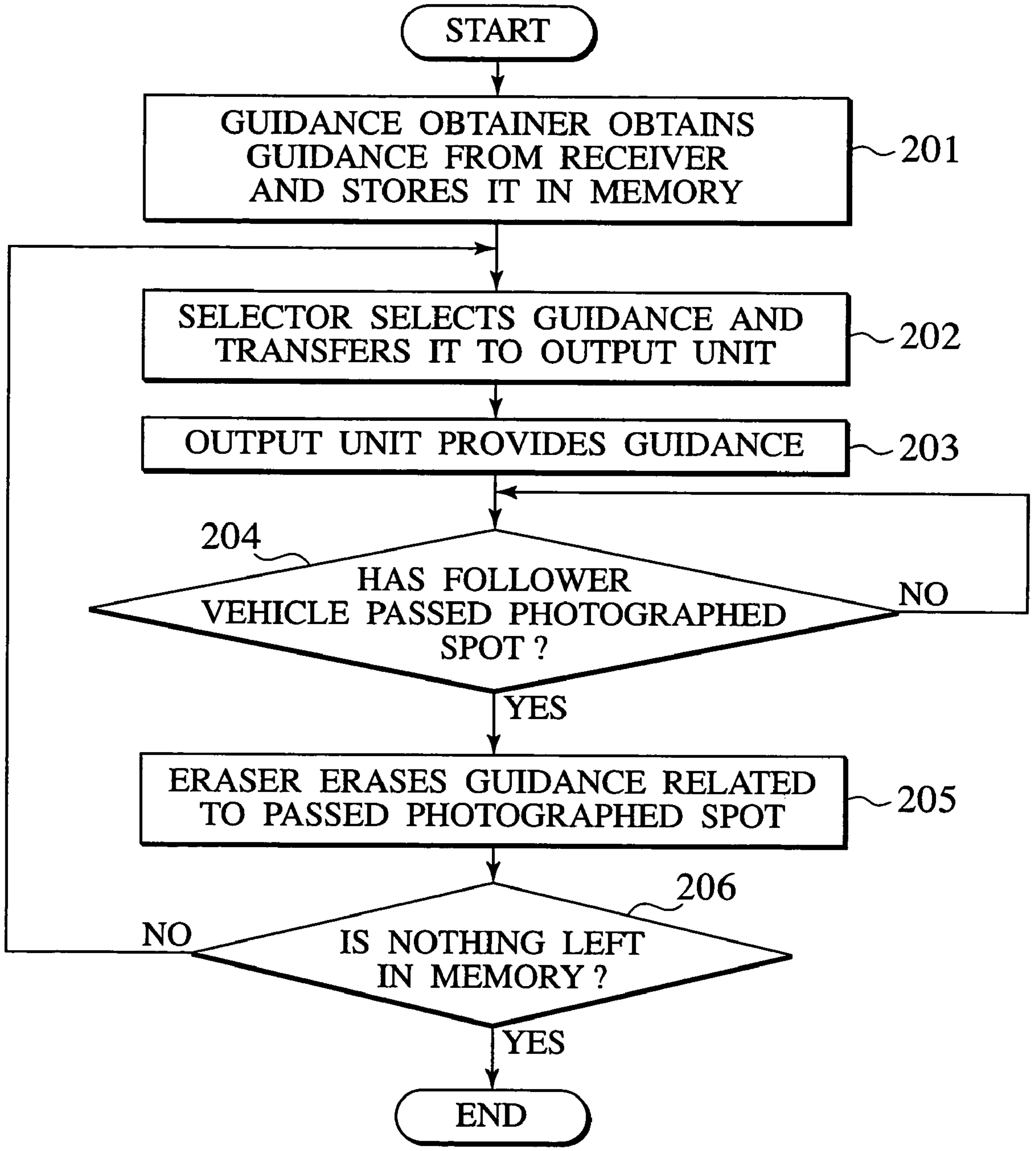
FIG. 4 is a flowchart showing a control procedure of a presenter according to the embodiment.
Figure 5:
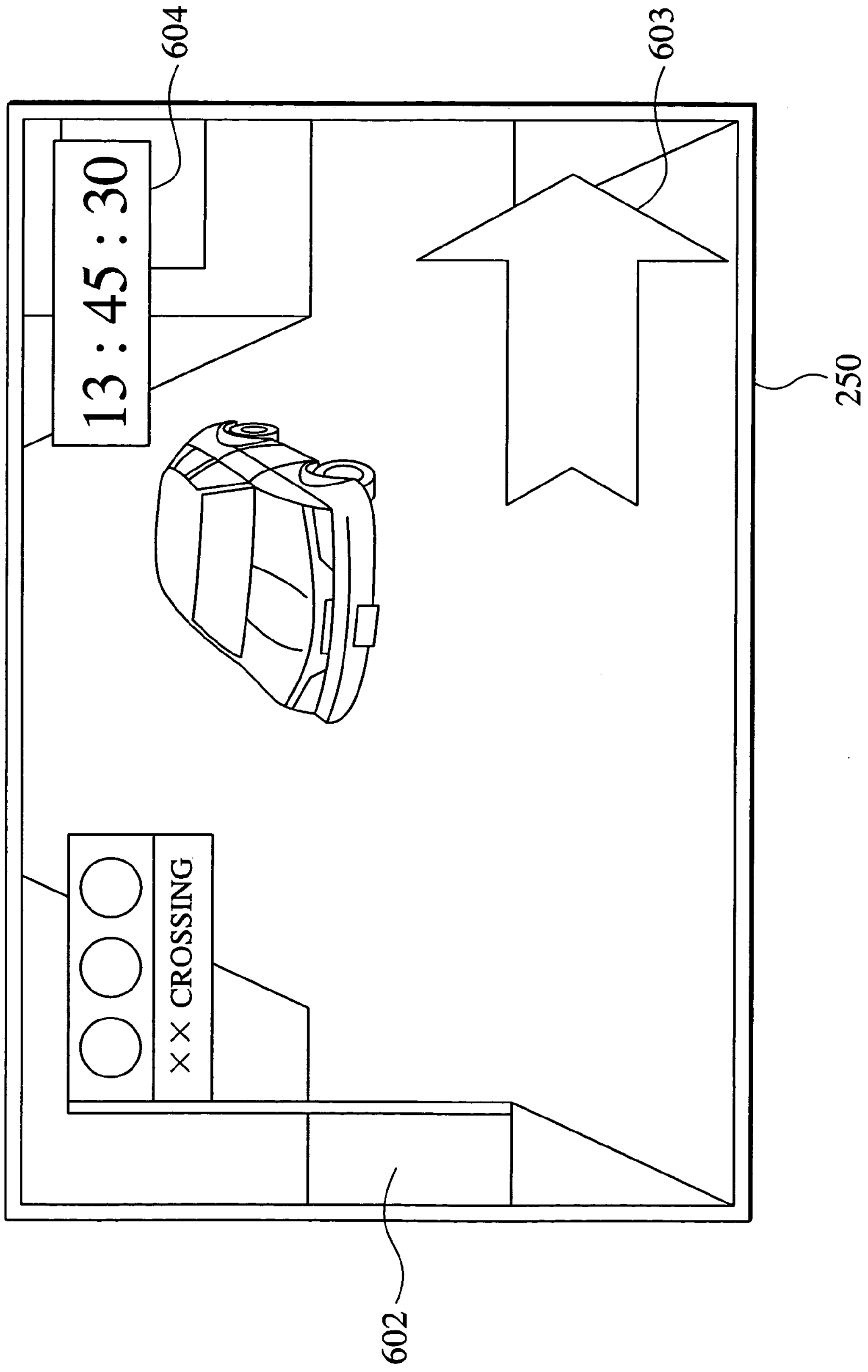
FIG. 5 is a view showing an example of guidance.

FIG. 4 is a flowchart showing an example of control of the operation of the presenter 200. The receiver 210 employs a narrow-band communication unit or a mobile communication unit to obtain an image ahead of the leader vehicle and one or more of a position (photographed spot), time (photographed time), and a running speed related to the leader vehicle and a vehicle-to-vehicle distance and stores the obtained data in a memory (S201). Then, the selector 223 transfers an image that is temporally oldest among those stored in the memory to the output unit (display) 250 (S202). The display displays guidance at least including the image for persons in the follower vehicle (S203). FIG. 5 shows an example of the displayed guidance.

In FIG. 5, the exemplary image 602 transmitted from the leader vehicle is displayed on the output unit 250 of the presenter 200. The image 602 is an image ahead of the leader vehicle. Overlaid on the image 602 is an arrow mark 603 representative of a directional input to the turn signal of the leader vehicle. Also overlaid on the image 602 is time 604 that is the time when the leader vehicle passed a crossing shown in the image 602, or the time when the image 602 was taken.

In addition to the time, a running speed, a position, and a vehicle-to-vehicle distance may be overlaid on the image 602, or may be displayed in a separate window on the screen. Information pieces to be contained in the guidance and a method of overlaying such information pieces are not limited to specific ones. The direction displayed on the output unit 250 informs the driver of the follower vehicle of a steering direction. The time, position, and vehicle-to-vehicle distance allow the driver of the follower vehicle to find a positional relationship between the leader vehicle and the follower vehicle and a delay from the leader vehicle.

At or around the selection of guidance by the selector 223 and the presentation of the guidance by the output unit 250, the eraser 222 erases guidance related to positions the follower vehicle has already passed (S204, S205). If the position (guidance prepared spot) contained in the guidance agrees with the present position of the follower vehicle, i.e., if the follower vehicle reached the position where the image ahead of the leader vehicle was taken, or if a predetermined time period passes after the arrival of the follower vehicle at the image taken position, the eraser 222 erases the guidance presently displayed on the display. The predetermined time period is determined in consideration of the detecting accuracy of the position and a time necessary for a steering operation of the follower vehicle. The output unit 250 checks to see if any guidance is left in the memory (S206). If there is no guidance in the memory, the guidance presenting operation ends. This embodiment employs a directional input as a trigger to prepare guidance, and therefore, if there is no information in the memory, it is understood that the leader vehicle is running just straight ahead the follower vehicle. Accordingly, the driver of the follower vehicle can drive straight until the reception of next guidance. If any guidance is left in the memory, step S202 is repeated to handle the guidance. Step S202 may select guidance with the use of the second function of the selector 223 mentioned above.

In this way, the follower vehicle that follows the leader vehicle can receive guidance that was prepared upon the detection of a state change in the leader vehicle and can follow the leader vehicle according to the guidance.

Second Embodiment

The second embodiment of the present invention differs from the first embodiment in that it detects a state change in the leader vehicle according to an ON input to a lamp of the leader vehicle and takes an image ahead of the leader vehicle at the lamp ON timing. The other arrangements of the second embodiment are the same as those of the first embodiment. A structural difference of the second embodiment from the first embodiment is a lamp input detector 112 provided for the state detector 110. A configuration of the second embodiment is as shown in FIG. 2.

A vehicle has many lamps such as fog lamps, head lamps, stop lamps, tail lamps, hazard lamps, and the like. This embodiment employs the fog lamps to detect a state change in the vehicle.

The guidance generator 120 employs an input to a fog lamp switch as a trigger to photograph a view ahead of the leader vehicle and transfers the photographed image to the follower vehicle or the server 400 (FIG. 1). The timing when the fog lamps are turned on corresponds to the timing when the fog thickens to make visibility unclear. An image taken at this timing shows a condition of the fog.

Figure 6:
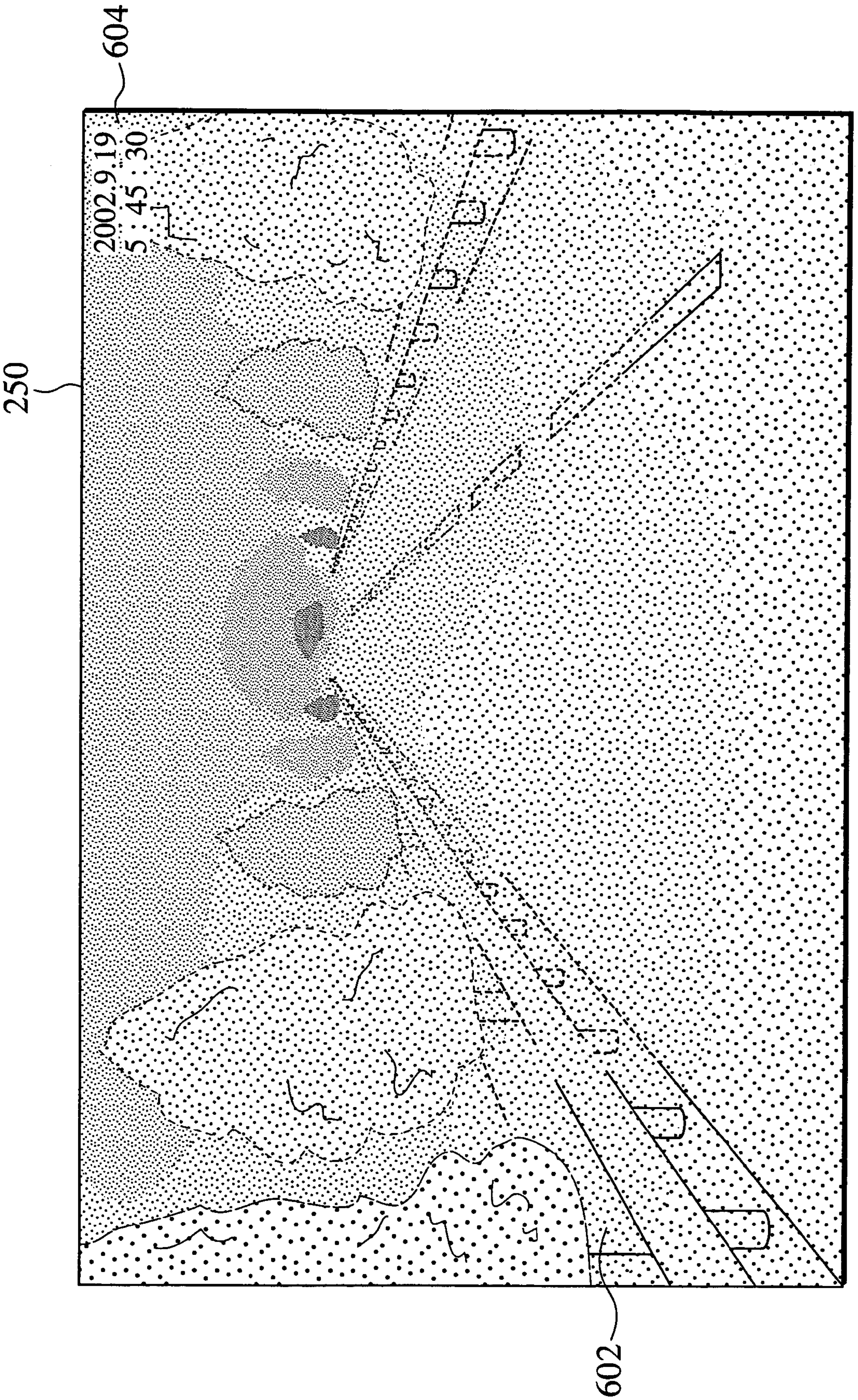
FIG. 6 is a view showing another example of guidance.

FIG. 6 shows an exemplary image taken according to the embodiment. Preferably, the image 602 includes information 604 on photographed time and position. The information showing a fog condition is useful to guide the follower vehicle. For users who need weather information, in particular, fog information, the image of fog will serve as real-time information.

The operation of the sender 100 is basically the same as that of the first embodiment explained with reference to FIG. 3. According to the second embodiment, an ON input to the fog lamps is detected in step S101, and the guidance generator 120 obtains an image in response to the ON input to the fog lamps as a trigger. Guidance including the photographed image is sent to the presenter 200 or to the server 400.

The operation of the presenter 200 is basically the same as that of the first embodiment explained with reference to FIG. 4. The guidance including the photographed image is directly received from the sender 100 or via the server 400. When the fog lamps are turned on, a pinpoint fog image is sent as weather information in real time. The driver and other persons in the follower vehicle can learn visibility in tracing the leader vehicle. The information providing device of the present invention is achievable with a computer that executes an information providing program according to the present invention.

The sender (information providing device) 100 and presenter (information providing device) 200 may be fixed to the leader and follower vehicles, respectively. Instead, they may be portable devices to be possessed by persons in the leader and follower vehicles, respectively. In this case, the state detector 110 of the sender 100 is connected to the turn signal or lamp switch of the vehicle to access the same. The guidance generator 120 is connected to the photographing unit, speed detector, history detector (navigator), or timer of the vehicle to access the same. The history detector 230 of the presenter 200 is connected to a navigator installed in the vehicle, to access the same.

The information providing device and system thereof may be realized as a system such as a computer system that has a processor and memory stored a program. Especially, the computer system can be specialized for vehicle. When realizing information providing, the program is installed into the system from the system-readable medium and is read by the system so that the program is executed by the processor of the system. In this way, the system realizes the information providing according to the present invention. The system-readable medium may be a semiconductor memory, a magnetic disk, an optical disk, a magneto optic disk, a magnetic tape, etc.

The entire content of Japanese Patent Application No. 2003-101099 filed on Apr. 4th, 2003 is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An information providing device installed in a leader vehicle that leads a follower vehicle, for providing the follower vehicle with guidance prepared by the leader vehicle, the information providing device comprising:

a state detector configured to detect a state change in the leader vehicle to output a detecting signal, wherein the state change occurs in the vehicle when a driver of the vehicle provides an input to the vehicle; and a guidance generator configured to prepare, in response to the detecting signal, the guidance to guide the follower vehicle, wherein the guidance includes a photographed image of a view ahead of the leader vehicle, and information of the state change overlaid on the photographed image.

2. The information providing device according to claim 1, wherein the state detector is coupled to a turn signal installed in the leader vehicle, detects operation of the turn signal and outputs the detecting signal.

3. The information providing device according to claim 2, wherein the guidance generator obtains a directional input to the turn signal.

4. The information providing device according to claim 1, wherein the guidance generator obtains a position of the leader vehicle.

5. The information providing device according to claim 1, wherein the guidance generator obtains time on the leader vehicle.

6. The information providing device according to claim 1, wherein the guidance generator obtains a running speed of the leader vehicle.

7. The information providing device according to claim 1, wherein the guidance generator obtains a relative distance between the leader vehicle and the follower vehicle according to a running speed of the leader vehicle, a position of the leader vehicle related to time, a running speed of the follower vehicle, and a position of the follower vehicle related to time.

8. The device of claim 1, wherein the state detector detects the input to the vehicle by the driver, and generates the output signal according to the detected input by the driver.

9. The information providing device installed in a leader vehicle that leads a follower vehicle, for providing the follower vehicle with guidance prepared by the leader vehicle, the information providing device comprising:

a state detector configured to detect a state change in the leader vehicle to output a detecting signal, wherein the state change occurs in the vehicle when a driver of the vehicle gives an input to the vehicle; and a guidance generator configured to prepare, in response to the detecting signal, guidance to guide the follower vehicle, wherein the guidance including a photographed image of a view ahead of the leader vehicle, wherein:

the state detector coupled to a lamp switch detects operation of the lamp switch installed in the leader vehicle and outputs the detecting signal; and the guidance includes an image ahead of the leader vehicle photographed when the lamp is turned on.

10. An information providing device installed in a follower vehicle that follows a leader vehicle, comprising:

a guidance obtainer configured to obtain guidance including a photographed image of a view ahead of the leader vehicle that leads the follower vehicle, a position and time indicating where and when the guidance was prepared;

a history detector configured to detect running history of the follower vehicle; and an output unit configured to provide with the guidance obtained by the guidance obtainer, wherein the guidance obtainer includes, an eraser configured to compare the running history detected by the history detector with the position where the guidance was prepared and erase the guidance if a result of the comparison shows that the follower vehicle has already passed the position; and a selector configured to select the oldest guidance from among guidance pieces not erased by the eraser and transfer the selected guidance to the output unit.

11. An information providing device comprising:

a guidance obtainer configured to obtain guidance including a photographed image of a view ahead of a leader vehicle that leads a follower vehicle, information of a state change of the leader vehicle overlaid on the photographed image, said state change occurring in the leader vehicle when a driver of the leader vehicle gives an input to the leader vehicle, and a position where the guidance was prepared;

a history detector configured to detect running history of the follower vehicle; and an output unit configured to provide with the guidance obtained by the guidance obtainer, wherein the guidance obtainer includes a selector configured to compare the running history with the position, the selector configured to select the guidance that was prepared at the closest position ahead of a present position of the follower vehicle, and the selector configured to transfer the selected guidance to the output unit.

12. The information providing device according to claim 11, wherein:

the obtained guidance includes the position where the leader vehicle prepared the obtained guidance, time when the leader vehicle passed the position, and a speed of the leader vehicle; and the guidance obtainer finds a relative distance between the leader vehicle and the follower vehicle according to the position, time, and speed of the leader vehicle contained in the obtained guidance and the position, time, and speed of the follower vehicle detected by the history detector.

13. An information providing system comprising:

a sender used when a vehicle is a leader vehicle that leads a follower vehicle, wherein the sender is configured to provide the follower vehicle with guidance for guiding the follower vehicle, the sender including:

a state detector configured to detect a state change in the leader vehicle, wherein the state change occurs in the vehicle when a driver of the vehicle provides an input to the vehicle; and a guidance generator configured to prepare, in response to the state change detected by the state detector, the guidance including a photographed image of a view ahead of the leader vehicle, and information of the state change overlaid on the photographed image;

and a presenter, installed in the follower vehicle, configured to receive the sent guidance and to present the guidance, the presenter including:

a guidance obtainer configured to obtain the guidance including the photographed image of the view ahead of the leader vehicle; and an output unit configured to provide the user with the guidance obtained by the guidance obtainer.

14. The system of claim 13, wherein the state detector detects the input to the vehicle by the driver, and generates the output signal according to the detected input by the driver.

15. An information providing device installed in a leader vehicle that leads a follower vehicle, for providing the follower vehicle with guidance prepared by the leader vehicle, the information providing device comprising:

a state detecting means for detecting a state change in the leader vehicle to output a detecting signal, wherein the state change occurs in the vehicle when a driver of the vehicle provides an input to the vehicle; and a guidance generating means for preparing, in response to the detecting signal, guidance to guide the follower vehicle, the guidance including a photographed image of a view ahead of the leader vehicle, and information of the state change overlaid on the photographed image.

16. The device of claim 15, wherein the state detecting means detects the input to the vehicle by the driver, and generates the output signal according to the detected input by the driver.

17. A program product in a system-readable medium for execution by a system installed in a leader vehicle that leads a follower vehicle, the program product comprising:

detecting instructions that causes the system to detect a state change in the leader vehicle to output a detecting signal, wherein the state change occurs in the vehicle when a driver of the vehicle provides an input to the vehicle;

guidance generating instructions that causes the system to prepare, in response to the detecting signal, guidance to guide the follower vehicle, wherein the guidance includes a photographed image of a view ahead of the leader vehicle, and information of the state change overlaid on the photographed image; and transferring instructions that cause the system to transfer the prepared guidance to the follower vehicle.

18. The program product of claim 17, wherein the detecting instructions cause the system to detect the input to the vehicle by the driver, and to generate the output signal according to the detected input by the driver.

19. A program product in a system-readable medium for the system installed in a follower vehicle that follows a leader vehicle, the program product for information providing, the program product comprising:

guidance obtaining instructions that obtain guidance including a photographed image of a view ahead of the leader vehicle that leads the follower vehicle, a position and time indicating where and when the guidance was prepared;

a history detecting instructions that detect running history of the follower vehicle; and a providing instructions that provide a user with the guidance obtained, wherein the guidance obtaining instructions includes, erasing instructions that compare the running history detected by the history detecting instructions with the position where the guidance was prepared and erase the guidance if a result of the comparison shows that the follower vehicle has already passed the position; and selecting instructions that select the oldest guidance from among guidance pieces not erased by the eraser and transfer the selected guidance.

20. A program product in a system-readable medium for information providing, the program product comprising:

guidance obtaining instructions that obtain guidance including a photographed image of a view ahead of a leader vehicle that leads a follower vehicle, information of a state change of the leader vehicle overlaid on the photographed image, said state change occurring in the leader vehicle when a driver of the leader vehicle gives an input to the leader vehicle, and a position where the guidance was prepared;

detecting instructions that detect running history of the follower vehicle; and providing instructions that provide with the guidance obtained, wherein the guidance obtaining instructions comprises selecting instructions for comparing the running history detected by the history detecting instructions with the position where the guidance was prepared, the selecting instructions for selecting guidance that was prepared at the closest position ahead of a present position of the follower vehicle, and the selecting instructions for transferring the selected guidance to the providing instructions.

* * * * *